Sept. 4, 1951  A. MAHLE  2,566,990
HEATED AQUARIUM
Filed Sept. 5, 1947
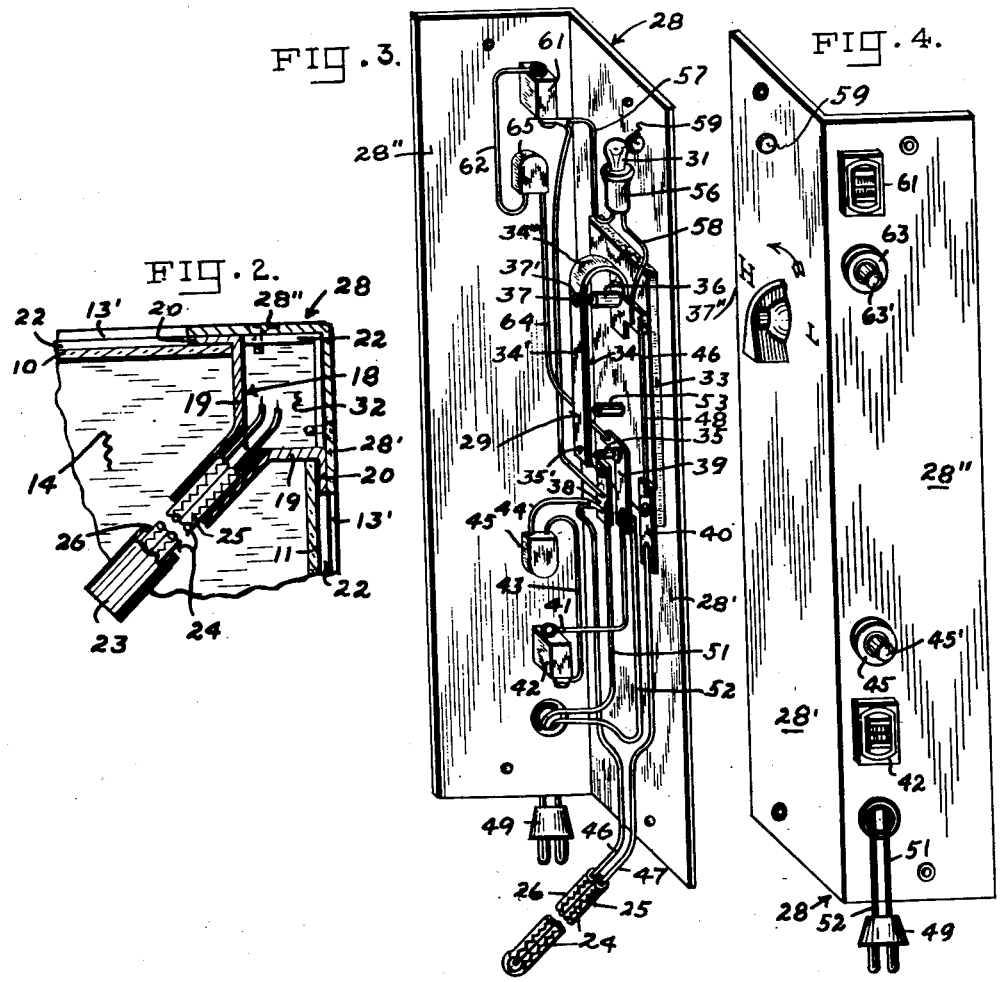
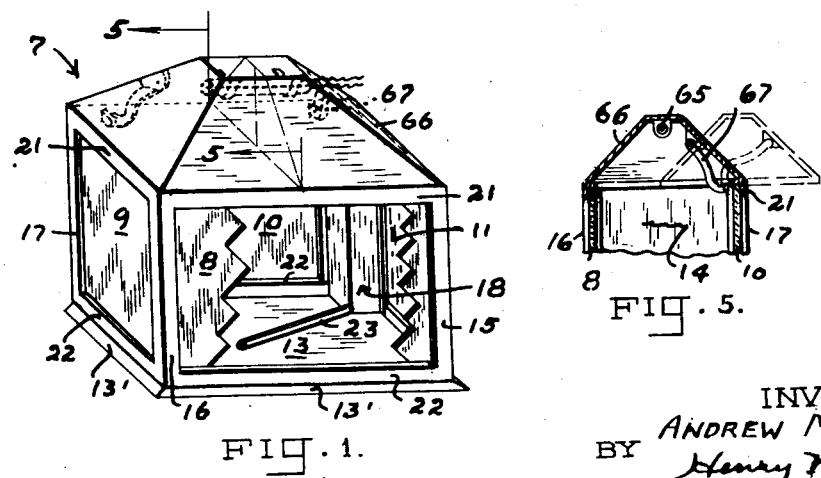
INVENTOR.
ANDREW MAHLE
BY Henry N. Young
ATTORNEY Patented Sept. 4, 1951

2,566,990

UNITED STATES PATENT OFFICE 2,566,990

HEATED AQUARIUM

Andrew Mahle, Oakland, Calif.

Application September 5, 1947, Serial No. 772,373

5 Claims. (Cl. 219—38)

The invention relates to an automatic control of the temperature of a body of heated liquid, and more particularly of that of the water in an aquarium.

An object of the invention is to provide a particularly simple and effective means for maintaining an appropriate super-atmospheric temperature for marine life in an aquarium or the like through the provision and control of a heating means for the water.

A more specific object is to provide a particularly simple and effective thermostat control device for the water heating means.

A further object is to provide a unitary electric heating and control assembly which may be readily regulated while in its installed relation to a container in which liquid is to be heated.

The invention possesses other objects and features of advantage, some of which, with the foregoing, will be set forth or be apparent in the following description of a typical embodiment thereof, and in the accompanying drawings, in which Figure 1 is a perspective view of an aquarium structure embodying the features of present invention.

Figure 2 is an enlarged fragmentary plan section taken at one corner of the aquarium and at the level of an electric heating coil of the assembly.

Figure 3 is an inside perspective view of a removable member of the aquarium structure which mounts the heating coil and the temperature control for the aquarium in unitary association.

Figure 4 is an outside perspective view of the member of Figure 3 and the elements which it mounts.

Figure 5 is a fragmentary transverse section of the upper portion of the aquarium taken at an upright plane through the line 5—5 of Figure 1.

The features of my invention are particularly shown as associated with the structure of an aquarium 7 comprising a tank having a front wall panel 8 and a side wall panel 9 and a rear wall panel 10 and a side wall panel 11, said panels being transparent and extending from a rectangular member 13 providing the bottom of the tank and having a continuous flange 13' around its edge. The various wall panels are sealedly mounted in suitable frames extending from the tank bottom 13, said frames being mutually coterminous at upright frame members 15 and 16 and 17 and 18 defining the corners of the tank space 14. The present corner members 15 and 16 and 17 are of angle section having their flanges mutually perpendicular and comprising the side elements of the different panel frames. For use in a manner to be hereinafter brought out, the corner member 18 is of W-section and comprises mutually perpendicular and coterminous web parts 19 having flanges 20 extending from their outer edges, said flanges being mutually perpendicular and being directed outwardly of the trough defined by the webs 19.

Upper and lower members 21 and 22 of appropriate lengths connect the flanges of the various corner members at their top and bottom respectively in flush relation therewith, the top frame members 21 defining the rim of the tank, while the bottom frame members 22 are in sealed relation to the bottom 13. The various panels of the tank are sealedly secured in place against the opposed frame elements in any suitable manner; the present structure assumes a fixing of the panels in place against the frame members by means of a suitable water-proof and water-tight adhesive such as a resinous gum. The V-shaped web portion 19—19 of the corner member 18 extends inwardly of the line of intersection of its flanges 20, and the bottom of this member is in fixed sealed relation to the bottom 13, as are the bottom ends of the other corner members 15 and 16 and 17.

At, or adjacent, its bottom, the member 18 has a watertight receptacle 23 extending from it in overlying relation to the aquarium bottom 13 and arranged to receive an electric heating unit 24. The present receptacle 23 is of a suitable heat-conductive material, has its inner end at the member 18 in open communication with the channel of the webs 19, and has its outer end closed whereby it provides, in effect, a cup-like extension of the space defined between the webs 19. The heating unit 24 is essentially of the coil type, having a helically formed continuous conductor 25 extending through an insulation tube 26, said unit being freely insertable in the sheath provided by the receptacle 23.

It will now be noted that a member 28 of angle section is provided for mounting opposite the through defined by the web portions 19 of the corner member 18, said member being formed of sheet material and having outer portions of its flanges 28' and 28" arranged to overlie the different flanges 20 of the member 18, and be releasably secured in position thereagainst in a suitable manner. The member 28 mounts a thermostatic switch assembly 29, a tell-tale lamp 31, and electrical connections and switches hereinafter identified. The upright and laterally closed space 32 of rectangular cross-section defined between the members 18 and 28 is arranged to be heated from the water in the tank for controlling the action of the thermostatic switch 29 which in turn controls the supply of electrical energy to the heating unit 24 for maintaining a desired predetermined temperature in the water in the tank.

As particularly illustrated, the thermostatic switch 29 is mounted on the flange 28' of the member 28 at its inner side. The base 33 of the switch assembly is of electrically non-conductive material and is suitably fixed to and against the inner face of the flange 28'. The base 33 mounts a J-shaped conductor strip 34 having a generally straight portion 34' of laminated and resiliently flexible bi-metallic structure extending from a return bend portion 34'' which is fixed to the base 33 at its end portion so that a change in temperature of the bi-metallic portion of the strip may move the free end of its portion 34' toward or from the base 33 which mounts a contact member 35 for engagement by a complementary contact member 35' on the free end of the portion 34' when the strip has a pre-determined temperature.

Understanding that the free end of the bi-metallic portion 34' of the strip 34 will move toward the contact member 35 as the temperature of the portion is lowered, means are preferably provided for so setting the strip portion 34' that it will engage the contact 35 for energizing the heater circuit when a particular temperature prevails in the space 32 in accordance with an undesirably low temperature of the water in the aquarium tank. It will be understood that the temperature in the space 32 is controlled by a heat exchange action through the web portions 19 of the corner member 18 of the aquarium receptacle.

As particularly shown, an internally threaded sleeve 36 extends across the bend of the strip portion 34'' from the secured end of the strip and mounts a screw 37 freely engaged through an opening provided in the opposed strip portion with its head 37' engaging the outer face of the strip. The screw 37 extends through the base 33 and the flange 28' which mounts the base, and carries a knob 37'' at its outer end for use in turning the screw to adjustably set the end of the contact arm 34' opposite the contact 35; as brought out in Figure 4, the outer side of the flange 28' is provided with suitable indicia for indicating the required rotative adjustments of the screw 37 for providing a higher or lower limiting temperature in the aquarium water.

As illustrated, the end of the switch base 33 which mounts the contact 35 is lowermost and provides connector members 38 and 39 and 40, the intermediate connector member 39 carrying the contact member 35. The member 39 is connected by a wire 41 to one terminal of an outlet plug socket 42 mounted on the flange 28'' and arranged to receive a usual two-pronged connector plug at the outer side of the flange. The other terminal of the outlet socket 42 is connected by a wire 43 to one terminal of a rotary single-pole snap switch 45 mounted on the flange 28'' and having its control knob 45' extending outwardly from the flange, while the other terminal of the switch 45 is connected to the connector 38 on the base by means of a wire 44.

A terminal wire 46 of the heating coil 25 is connected to the connector 38 while the other terminal wire 47 of the coil is connected to the connector 40 which is in turn connected to the base portion of the strip 34 by a wire 48 to complete a circuit between the connectors 38 and 39 which includes the coil 25 and thermostatic switch 29. For energizing the aforesaid circuit, the connectors 38 and 39 are connected with the different terminals of a connector plug 49 by wires 51 and 52 respectively which extend through and from the flange 28'', whereby the circuit may be energized when the plug is inserted in a power-supply socket (not shown).

Having the attachment plug 49 engaged in a power supply socket, and having the temperature in the space 32 corresponding to a water temperature below that desired for the aquarium whereby the bi-metallic switch arm 34' engages the contact 35, and having the thermostatic switch circuit closed at the switch 45, the resulting energizing of the heating coil 25 will heat the water in the tank until heat radiating from the water will heat the "control space" 32 until the temperature therein and of the strip 34 is sufficient to open the heater circuit at the contact member 35. Since it is generally desirable that the water in an aquarium be aerated, connections may be conveniently made at the socket 42 for operating a suitable electrically actuated water-aerating device.

Means are preferably provided such that the automatic control of the heating of the water in the tank may not be too sensitive, whereby to avoid frequent actuations of the thermostatic switch for maintaining the desired temperature in the water. As particularly shown, a permanent bar magnet 53 extends from the switch base 33 adjacent the contact 35 to dispose its outer end in such a position with respect to the opposed switch arm 34' that it may magnetically attract and hold the arm to it while the arm engages the contact 35. As the heating of the arm 34' tends to flex it away from the contact 35, the magnet 53 will maintain the engagement of the arm with the contact until the retaining pull of the magnet 53 is overcome by the effect of the increasing temperature of the arm to break the circuit. It will be understood that the magnet also provides a certain degree of snap action at the contact 35 when the coil circuit is either opened or closed thereat.

It will now be noted that the tell-tale lamp 31 is mounted in a socket 56 having its terminals connected by wires 57 and 58 to the connection member 38 and to the fixed end of the switch member 34 respectively whereby the lamp is arranged to be lighted while, and only while, the heating coil is energized. A sight-opening 59 is provided in the flange 28' of the member 28 generally opposite the lamp 31 whereby the lighting of the lamp while the heating coil is operating may be readily noted.

Intermediately thereof, the wire 57 is connected with one terminal of an outlet socket 61 which is arranged for engagement by a connection plug from the outside of the flange. The other terminal of said socket is connected by a wire 62 with one terminal of a switch 63 which is similar to the switch 45 and presents its control knob 63' at the outer face of the flange 28'', the other terminal of this switch being connected by a wire 64 with the connector member 38. The constantly live socket 61 is provided for the attachment of an extension cord thereat, and more particularly for a conductor cord for a lamp 65 mounted within a hood-like top 66 for the tank.

The hood 66, it will be noted, is of frusto-pyramidal outline and is arranged for its seating upon the top rim of the tank to which it is hinged for movement between operative and inoperative positions upon the tank. In the present structure, links 67 are hingedly connected between corresponding inside points at one side of the hood with the top member 21 of the frame of the rear panel 19, the arrangement being such that the hood is seated upon the tank rim in either of its limiting covering and displaced positions. When the hood is displaced, access is given to the tank interior.

From the foregoing description taken in connection with the accompanying drawings, the advantages of the present aquarium features will be readily understood by those skilled in the art to which the invention appertains. While I have described the principle of operation, together with an arrangement which I now consider to be a preferred embodiment thereof, I desire to have it understood that the showings are primarily illustrative, and that such changes and developments may be made, when desired, as fall within the scope of the following claims.

I claim:

1. In an aquarium or the like, panel members extending from a base in mutually sealed relation to each other and to the base between corner frame members and sealedly related to said corner members and base, a said corner member being of generally W-section and having its flanges engaged by adjacent panels and its web portion directed inwardly of the line of intersection of its flanges, a member of angle section having its flanges fixed against the different flanges of the corner element to provide a closed space thereat, at least the web portion of the corner member being of heat-conducting material, a heating means operative in said tank, and a thermostatic control means for said heating means disposed within said space for actuation in accordance with the temperature therein.

2. A structure in accordance with claim 1 having a sealed heat-radiating container for the heating means extending from said closed space in open communication therewith and removably receiving the heating means.

3. In an aquarium or the like, panel members extending from a base in mutually sealed relation to each other and to the base between connecting members at corners thereof and sealedly related to said connecting members and the base, a connecting member at one corner being of generally W-section and having its flanges engaged by adjacent panels and its web portions directed inwardly of the line of intersection of its flanges, a member of angle section having its flanges fixed against the different flanges of the corner element to provide a closed space thereat, at least the web portion of said corner member being of heat-conducting material, an electric heating unit, means providing a sealed enclosure for said heating unit extending from the said space into the aquarium space, and a thermostatic control means for said heating unit disposed within said space for actuation in accordance with the temperature in said space.

4. In a tank having a heat-conducting side wall portion, an upright member removably mounted opposite said side wall portion outwardly thereof and directly cooperative therewith to define an upright laterally closed air space thereat, an electric heating unit, a heat-conducting sheath freely receiving said heating unit and providing a solely lateral extension of said space into the tank cavity in fixed sealed-off relation thereto, and adjustable thermostat control means directly connected to the heating unit and mounted on the closure member within said space for actuation in accordance with the temperature in the space and having an adjusting means therefor exposed for manual manipulation at the outer side of the closure member, and power connections for the circuit of the heating unit and thermostat mounted on the closure member and arranged for control from the outer side of the member.

5. In a tank having a heat-conducting wall portion, an upright member removably mounted opposite said wall portion outwardly thereof and cooperative therewith to provide a laterally closed air space thereat, an electric heating unit, a sealed heat-conducting sheath freely receiving said heating unit and extending directly from said space into the tank cavity in fixed relation to the tank bottom, an adjustable thermostatic control means for said heating unit disposed within said space and unitarily connected with the unit and having an adjusting member thereof exposed for manipulation at the outer side of the member, and a tell-tale lamp mounted on the first member and disposed in said space for energizing solely while the heating element is energized, said member being provided with a sight opening to provide for a viewing of said lamp therethrough.

ANDREW MAHLE.

REFERENCES CITED

The following references are of record in the file of this patent:

UNITED STATES PATENTS

| Number | Name | Date |
| --- | --- | --- |
| 1,397,766 | Lidberg | Nov. 22, 1921 |
| 1,994,909 | Ehrgott | Mar. 19, 1935 |
| 2,016,123 | Schorr | Oct. 1, 1935 |
| 2,088,728 | Stranszky | Aug. 3, 1937 |
| 2,286,470 | Dafforn et al. | June 16, 1942 |
| 2,314,467 | Tubbs | Mar. 23, 1943 |